(12) United States Patent
Fukui et al.

(10) Patent No.: US 9,894,268 B2
(45) Date of Patent: Feb. 13, 2018

(54) ELECTRONIC APPARATUS AND RECORDING CONTROL METHOD OF ELECTRONIC APPARATUS

(71) Applicant: KYOCERA CORPORATION, Kyoto (JP)

(72) Inventors: Yujiro Fukui, Yokohama (JP); Keisuke Nagata, Kobe (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/291,843

(22) Filed: Oct. 12, 2016

(65) Prior Publication Data

US 2017/0126964 A1 May 4, 2017

(30) Foreign Application Priority Data

Oct. 28, 2015 (JP) .................................. 2015-211528

(51) Int. Cl.
*H04N 5/77* (2006.01)
*H04N 5/232* (2006.01)
*H04N 5/247* (2006.01)

(52) U.S. Cl.
CPC ..... *H04N 5/23222* (2013.01); *H04N 5/23293* (2013.01); *H04N 5/247* (2013.01); *H04N 5/772* (2013.01)

(58) Field of Classification Search
None
See application file for complete search history.

(56) References Cited

U.S. PATENT DOCUMENTS

| 2011/0076003 | A1* | 3/2011 | Cho | G03B 17/20 396/297 |
| 2012/0038747 | A1* | 2/2012 | Kim | H04N 1/00307 348/47 |
| 2014/0232869 | A1* | 8/2014 | May | H04N 7/18 348/148 |
| 2016/0165101 | A1 | 6/2016 | Akiyama et al. | |
| 2017/0006328 | A1* | 1/2017 | Verticchio | H04N 21/4147 |

FOREIGN PATENT DOCUMENTS

JP 2015-26987 A 2/2015

* cited by examiner

*Primary Examiner* — Eileen Adams
(74) *Attorney, Agent, or Firm* — Duane Morris LLP

(57) ABSTRACT

An electronic apparatus includes a first camera and a second camera each configured to be able to image a video, a lens covering the second camera, at least one processor configured to control recordings of the videos captured by the first camera and the second camera, and a display screen configured to display the videos captured by the first camera and the second camera. The at least one processor is configured to detect, on the basis of an image data captured by the second camera, whether at least part of the lens is covered with an obstruction that blocks imaging during the recording of the video captured by the second camera, and control so as to switch the recording of the video captured by the second camera to the recording of the video captured by the first camera in a case where the at least part of the lens is covered with the obstruction.

8 Claims, 13 Drawing Sheets

F I G . 3
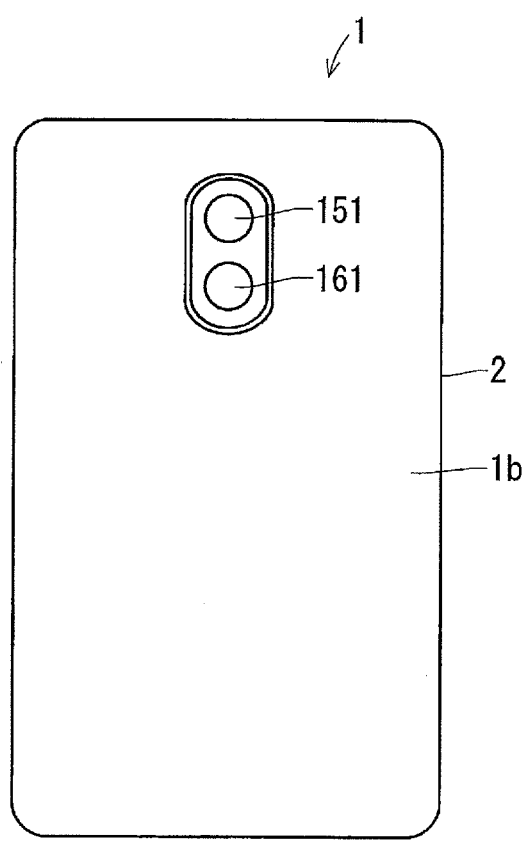

F I G . 4
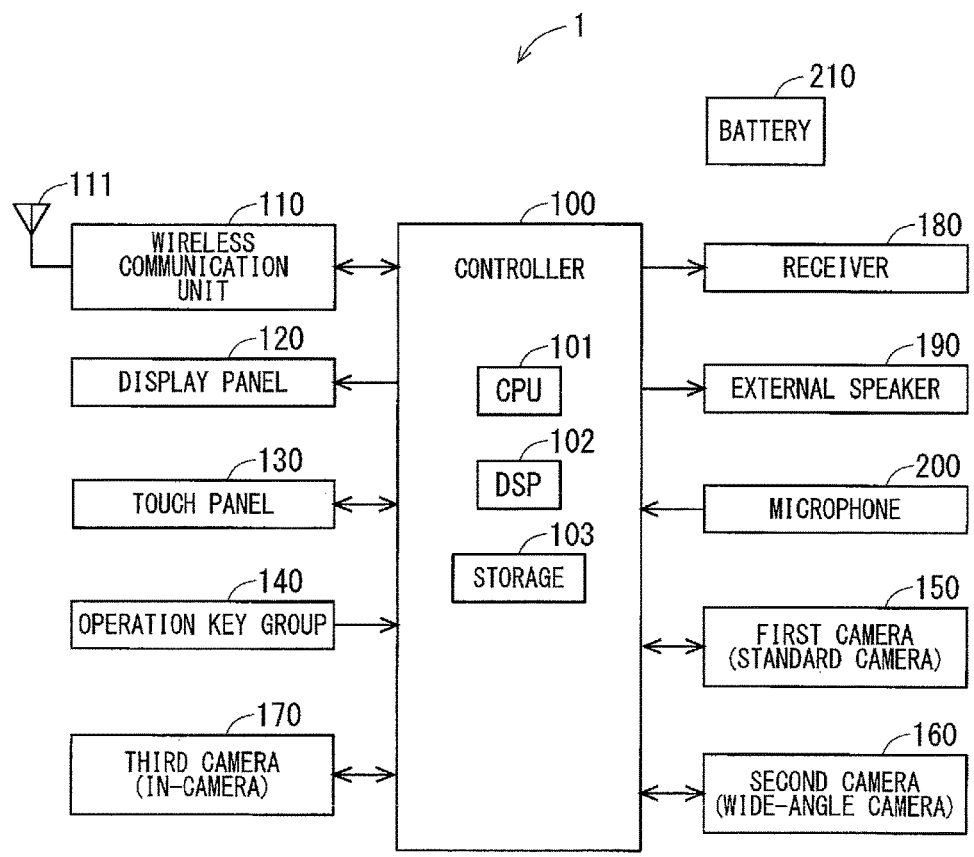

F I G . 6
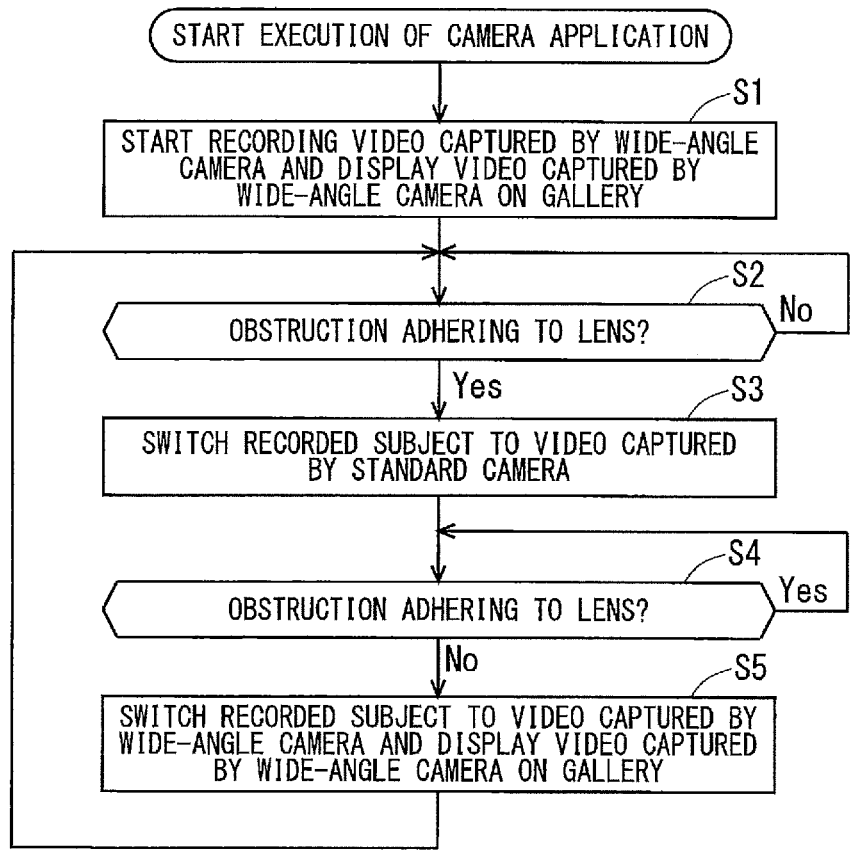

F I G . 1 2
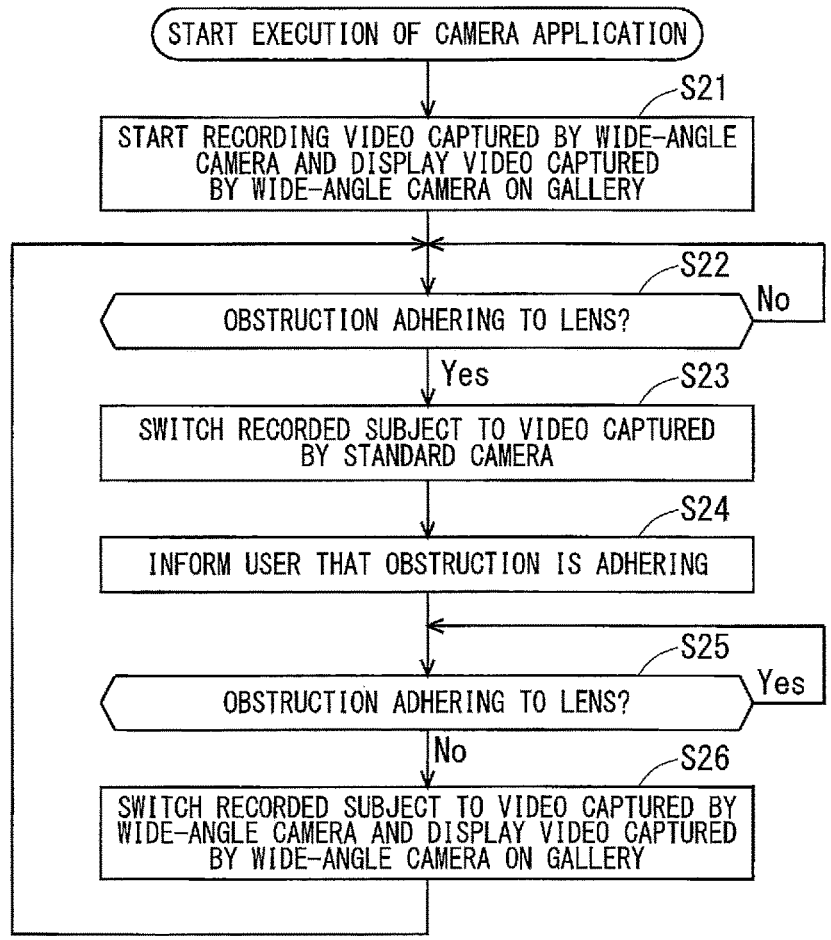

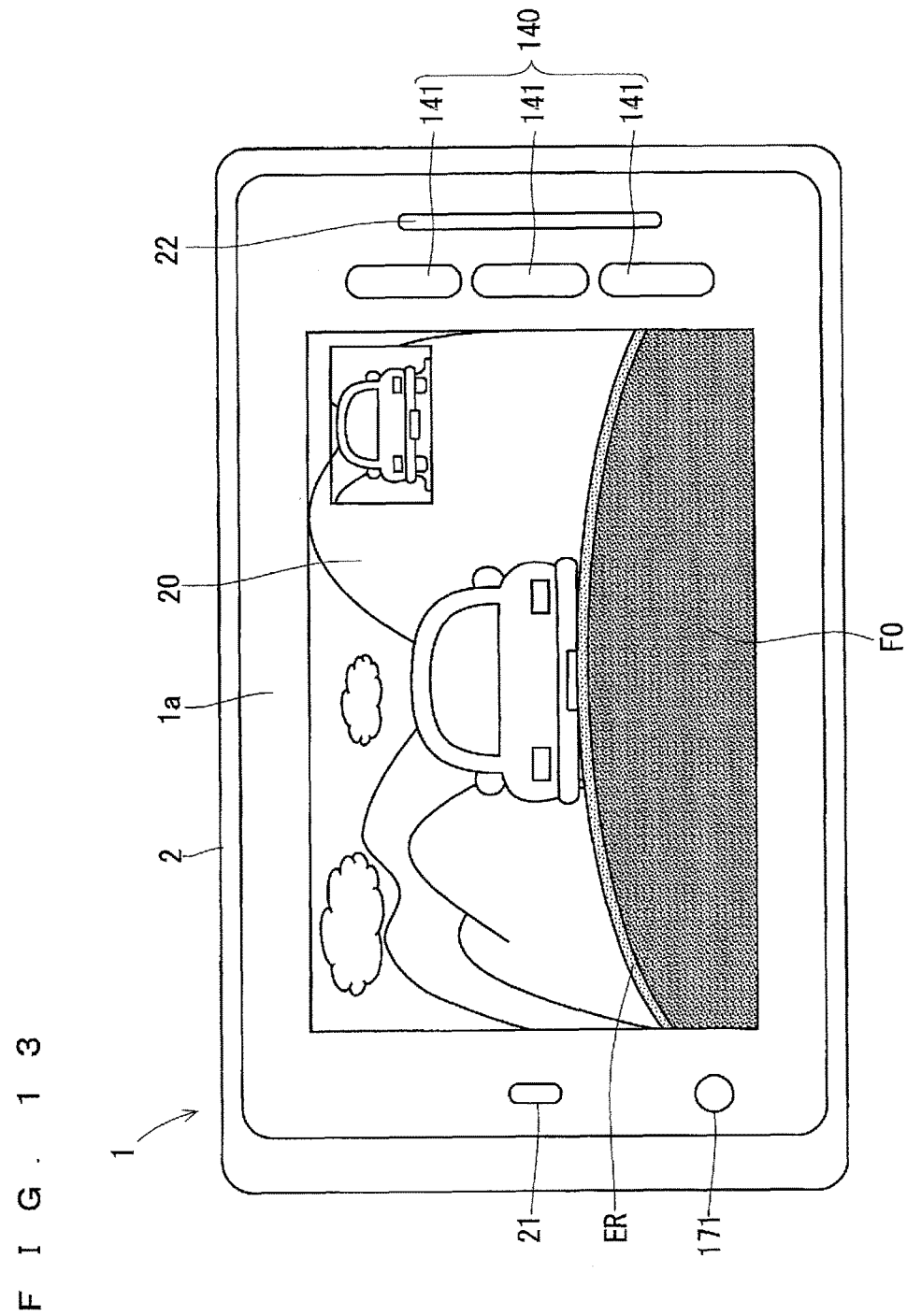

ELECTRONIC APPARATUS AND RECORDING CONTROL METHOD OF ELECTRONIC APPARATUS

CROSS-REFERENCE TO RELATED APPLICATION

The present application claims priority under 35 U.S.C. § 119 to Japanese Patent Application No. 2015-211528, filed on Oct. 28, 2015, entitled "ELECTRONIC APPARATUS AND RECORDING CONTROL METHOD OF ELECTRONIC APPARATUS". The content of which is incorporated by reference herein in its entirety.

FIELD

Embodiments of the present disclosure relate to an electronic apparatus.

BACKGROUND

Various techniques have conventionally been proposed for an electronic apparatus including a camera.

SUMMARY

An electronic apparatus is disclosed. In one embodiment, an electronic apparatus includes a first camera and a second camera each configured to be able to image a video, a lens covering the second camera, at least one processor configured to control recordings of the videos captured by the first camera and the second camera, and a display screen configured to display the videos captured by the first camera and the second camera. The at least one processor is configured to detect, on the basis of an image data captured by the second camera, whether at least part of the lens is covered with an obstruction that blocks imaging during the recording of the video captured by the second camera, and control so as to switch the recording of the video captured by the second camera to the recording of the video captured by the first camera in a case where the at least part of the lens is covered with the obstruction.

A recording control method of an electronic apparatus is disclosed. In one embodiment, a recording control method of an electronic apparatus is a recording control method of the electronic apparatus that includes a first camera and a second camera each configured to be able to image a video, a lens covering the second camera, at least one processor configured to control recordings of the videos captured by the first camera and the second camera, and a display screen configured to display the videos captured by the first camera and the second camera. The at least one processor performs recording control that includes the steps of: (a) detecting, on the basis of an image data captured by the second camera, whether at least part of the lens is covered with an obstruction that blocks imaging during the recording of the video captured by the second camera; and (b) switching the recording of the video captured by the second camera to the recording of the video captured by the first camera in a case where it is detected that the lens is covered with the obstruction in the step (a).

BRIEF DESCRIPTION OF THE DRAWINGS

FIG. 3 illustrates a rear view showing the external appearance of the electronic apparatus.

FIG. 4 illustrates a block diagram showing a configuration of the electronic apparatus.

FIG. 6 illustrates a flowchart showing operations of the electronic apparatus.

FIG. 12 illustrates a flowchart showing operations of the electronic apparatus.

FIG. 13 illustrates an example display of the display screen.

DETAILED DESCRIPTION

External Appearance of Electronic Apparatus

Figure 1:
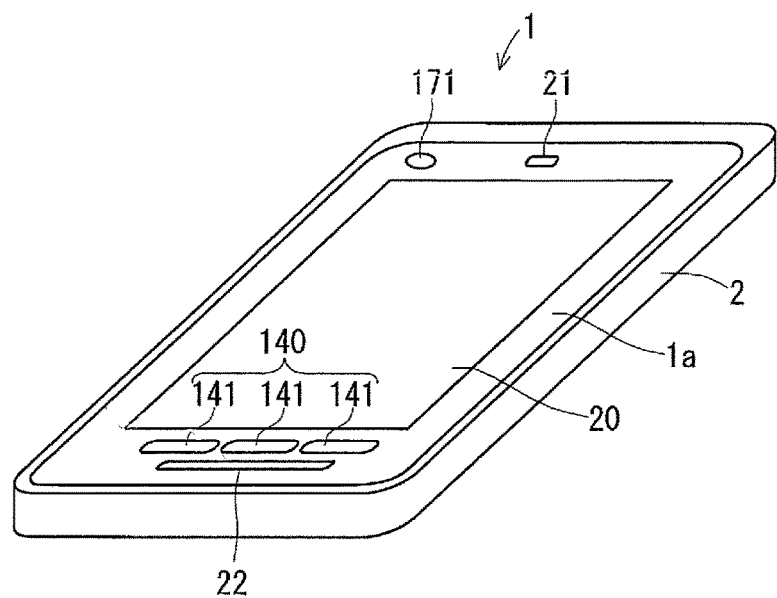
FIG. 1 illustrates a perspective view showing an external appearance of an electronic apparatus.
Figure 2:
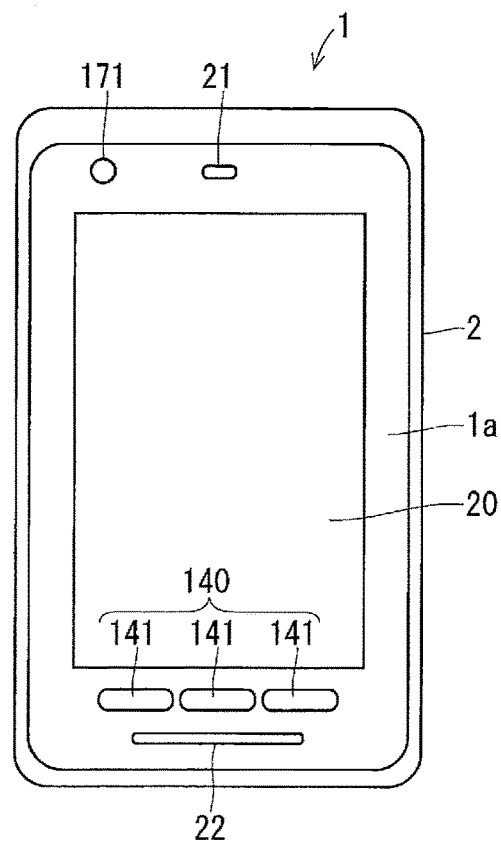
FIG. 2 illustrates a front view showing the external appearance of the electronic apparatus.

FIGS. 1 to 3 respectively illustrate a perspective view, a front view, and a rear view showing an external appearance of an electronic apparatus 1. The electronic apparatus 1 is, for example, a mobile phone such as a smartphone. As illustrated in FIGS. 1 to 3, the electronic apparatus 1 includes an apparatus case 2 having a plate shape substantially rectangular in a plan view. A front surface 1a of the electronic apparatus 1, namely, a front surface of the apparatus case 2 is provided with a display screen (display region) 20 on which various types of information such as characters, symbols, and diagrams are displayed. The display screen 20 is part of a cover panel that forms the front surface 1a of the electronic apparatus 1. A touch panel 130, which will be described below, is located on the rear side of the display screen 20. The user can accordingly input various types of information to the electronic apparatus 1 by operating the display screen 20 on the front surface 1a of the electronic apparatus 1 with a finger or the like. The user can also input various types of information to the electronic apparatus 1 by operating the display screen 20 with, for example, a pen for capacitive touch panel such as a stylus pen instead of the operator such as the finger.

The cover panel is, for example, made of transparent glass, transparent acrylic resin, or sapphire. Here, sapphire refers to a monocrystal that contains alumina ($Al_2O_3$) as a main component, and herein, refers to a monocrystal having a purity of $Al_2O_3$ of approximately 90% or more. The purity of $Al_2O_3$ is preferably greater than or equal to 99% in order to further increase resistance to scratching. The cover panel may be a composite panel (laminated panel) of a multilayer structure that includes a layer of sapphire. The cover panel may be a composite panel of a two-layered structure that includes a layer of sapphire (sapphire panel) located on the surface of the electronic apparatus 1 and a layer of glass (glass panel) attached to the layer of sapphire. The cover panel may be a composite panel of a three-layered structure that includes the layer of sapphire (sapphire panel) located on the surface of the electronic apparatus 1, the layer of glass (glass panel) attached to the layer of sapphire, and a layer of sapphire (sapphire panel) attached to the layer of glass. The cover panel may include a layer of crystalline materials such as diamond, zirconia, titania, crystal, lithium tantalite, and aluminum oxynitride in addition to sapphire.

The electronic apparatus 1 may be synchronized with wearable apparatuses (such as glasses, watches, and wristbands) and healthcare products.

A receiver hole 21 is located in an upper-side end portion of the front surface of the apparatus case 2. A lens 171 of a third camera 170, which will be described below, is visually recognizable from the upper-side end portion of the front surface of the apparatus case 2. As illustrated in FIG. 3, a lens 151 of a first camera 150 and a lens 161 of a second camera 160, which will be described below, are visually recognizable from a back surface 1b of the electronic apparatus 1, namely, a back surface of the apparatus case 2.

The lens 151 of the first camera 150 and the lens 161 of the second camera 160 are aligned close to each other in parallel with a long side of the apparatus case 2. The lens 151 is located closer to the upper-side end portion in which the receiver hole 21 is located, and the lens 161 is located adjacent to the lens 151. The positions may be reversed.

A speaker hole 22 is located in a lower-side end portion of the front surface of the apparatus case 2. An operation key group 140 including a plurality of operation keys 141 is located inside the apparatus case 2. Each of the operation keys 141 is a press button and has the surface exposed from the lower-side end portion of the front surface of the apparatus case 2. The user can provide various instructions to the electronic apparatus 1 by pressing each of the operation keys 141 with the finger or the like. The plurality of operation keys 141 include, for example, a home key, a back key, and a history key. The home key is an operation key for causing the display screen 20 to display a home screen. The back key is an operation key for switching the display of the display screen 20 to its previous screen. The history key is an operation key for causing the display screen 20 to display a history of the applications executed by the electronic apparatus 1.

Electrical Configuration of Electronic Apparatus

FIG. 4 illustrates a block diagram mainly showing an electrical configuration of the electronic apparatus 1. As illustrated in FIG. 4, the electronic apparatus 1 includes a controller 100, a wireless communication unit 110, a display panel 120, a touch panel 130, the operation key group 140, the first camera 150, the second camera 160, and the third camera 170. The electronic apparatus 1 further includes a receiver 180, an external speaker 190 (sound emitting unit), a microphone 200, and a battery 210. The apparatus case 2 houses each of these components provided in the electronic apparatus 1.

The controller 100 includes at least one processor such as a central processing unit (CPU) 101 and a digital signal processor (DSP) 102, and the controller 100 also includes a storage 103. The controller 100 can control the other components of the electronic apparatus 1 to perform overall control of the operation of the electronic apparatus 1. In accordance with various embodiments, the at least one processor may be implemented as a single integrated circuit (IC) or as multiple communicatively coupled IC's and/or discrete circuits. It is appreciated that the at least one processor can be implemented in accordance with various known technologies. In one embodiment, the at least one processor includes one or more circuits or units configurable to perform one or more data computing procedures or processes by executing instructions stored in an associated memory, for example. In other embodiments, the at least one processor may be implemented as firmware (e.g. discrete logic components) configured to perform one or more data computing procedures or processes. In accordance with various embodiments, the at least one processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

The storage 103 includes a non-transitory recording medium readable by the controller 100 (the CPU 101 and the DSP 102) such as a read only memory (ROM) and a random access memory (RAM). The storage 103 stores various programs for controlling the operations of the electronic apparatus 1, and specifically, for controlling the operations of each of the components such as the wireless communication unit 110 and the display panel 120 of the electronic apparatus 1. The CPU 101 and the DSP 102 execute the various programs in the storage 103 to achieve various functions of the controller 100. The storage 103 may include a non-transitory computer readable recording medium other than the ROM and the RAM. The storage 103 may include, for example, a compact hard disk drive and a solid state drive (SSD). All or some of the functions of the controller 100 may be achieved by a hardware circuit that needs no software to achieve the functions above.

The storage 103 stores various applications (application programs). The storage 103 stores, for example, a telephone application for performing a telephone call using telephone functions, a browser for displaying a website, and a mail application for generating, reading, transmitting, and receiving an e-mail message. The storage 103 stores, for example, a camera application for capturing an object using the first camera 150, the second camera 160, and the third camera 170, a map display application for displaying a map, a game application for playing a game such as a puzzle game in the electronic apparatus 1, and a musical reproduction control application for controlling reproduction of a music data stored in the storage 103.

The wireless communication unit 110 includes an antenna 111. The wireless communication unit 110 can receive, for example, a signal from a mobile phone different from the electronic apparatus 1 or a signal from a communication apparatus such as a web server connected to the Internet through the antenna via a base station. The wireless communication unit 110 can amplify and down-convert the received signal and then output a resultant signal to the controller 100. The controller 100 can modulate the received signal to acquire, for example, a sound signal indicative of the voice or music contained in the received signal. The wires communication unit 110 can also up-convert and amplify a transmission signal that includes the sound signal or the like and is generated by the controller 100 to wirelessly transmit the processed transmission signal from the antenna 111. The transmission signal from the antenna 111 is received, via the base station, by the mobile phone different from the electronic apparatus 1 or the communication apparatus connected to the Internet.

The display panel 120 is, for example, a liquid crystal panel or an organic electroluminescent (EL) panel. The display panel 120 can display various types of information such as characters, symbols, and graphics under the control of the controller 100. The display panel 120 is located so as to face the display screen 20 in the apparatus case 2. The information displayed on the display panel 120 is displayed on the display screen 20. The display screen 20 and the display panel 120 form a display that displays information to show the information to the user.

The touch panel 130 can detect an operation performed on the display screen 20 with the operator such as the finger. The touch panel 130 is, for example, a projected capacitive touch panel, and is located on the rear side of the display screen 20. When the user operates the display screen 20 with the operator such as the finger, an electrical signal corresponding to the operation is entered from the touch panel 130 to the controller 100. The controller 100 can according specify contents of the operation performed on the display screen 20 based on the electrical signal from the touch panel 130, thereby performing the process in accordance with the contents.

When the user presses each of the operation keys 141 of the operation key group 140, the operation key 141 outputs, to the controller 100, an operation signal indicating that the operation key 141 has been operated. The controller 100 can accordingly determine whether the operation key 141 has been operated. The controller 100 can perform the process corresponding to the operation key 141 that has been operated.

The microphone 200 can convert the sound from the outside of the electronic apparatus 1 into an electrical sound signal and then output the electrical sound signal to the controller 100. The sound from the outside of the electronic apparatus 1 is, for example, taken inside the electronic apparatus 1 through a microphone hole (not shown) located in the surface of the apparatus case 2 and entered to the microphone 200. The microphone hole is, for example, located in a lower side surface (bottom surface) of the apparatus case 2.

The external speaker 190 is, for example, a dynamic speaker. The external speaker 190 can convert an electrical sound signal from the controller 100 into a sound and then output the sound. The sound output from the external speaker 190 is, for example, output to the outside through the speaker hole 22. The sound output from the speaker hole 22 is set to a volume high enough to be heard in the place apart from the electronic apparatus 1.

The receiver 180 outputs a received sound. The receiver 180 comprises, for example, a dynamic speaker. The receiver 180 can convert an electrical sound signal from the controller 100 into a sound and then output the sound. The sound output from the receiver 180 is output to the outside through the receiver hole 21. The volume of the sound output from the receiver hole 21 is set to be lower than the volume of the sound output from the speaker hole 22. The receiver 180 may be replaced with a vibrator such as a piezoelectric vibrator that vibrates a front portion of the apparatus case 2 to transmit the sound from the front portion to the user.

The battery 210 can output a power source for the electronic apparatus 1. The battery 210 is, for example, a rechargeable battery. The power source output from the battery 210 is supplied to various circuits such as the controller 100 and the wireless communication unit 110 of the electronic apparatus 1.

The first camera 150 comprises the lens 151 and an image sensor. The second camera 160 comprises the lens 161 and an image sensor. The third camera 170 comprises the lens 171 and an image sensor. Each of the first camera 150, the second camera 160, and the third camera 170 can image an object under the control of the controller 100, generate a still image or a video showing the imaged object, and then output the still image or the video to the controller 100. At least one of the first camera 150, the second camera 160, and the third camera 170 may image an object by every one line and output one line of image to the controller 100 every time the one line of image is generated. In this case, the controller 100 generates a still image or a video based on a plurality of lines of image.

The lens 171 of the third camera 170 can be visually recognized from the front surface of the electronic apparatus 1, so that the third camera 170 can image an object located on the front surface side (the display screen 20 side) of the electronic apparatus 1. The third camera 170 above may also be referred to as an "in-camera".

The lens 151 of the first camera 150 can be visually recognized from the back surface of the electronic apparatus 1, so that the first camera 150 can image an object located on the back side of the electronic apparatus 1. Similarly, the lens 161 of the second camera 160 can be visually recognized from the back surface of the electronic apparatus 1, so that the second camera 160 can image an object located on the back side of the electronic apparatus 1. Each of the first camera 150 and the second camera 160 above may also be referred to as an "out-camera".

The second camera 160 can image an object with an angle wider than an angle with which the first camera 150 images an object. Herein, the "camera capable of imaging an object with a wide angle" means that, when each of the lens 151 and the lens 161 is a fixed-focal-length lens whose angle of view is fixed, the fixed angle of view of the second camera 160 is wider than the fixed angle of view of the first camera 150. In other words, the "camera capable of imaging an object with a wide angle" in this case means that the fixed focal length of the second camera 160 is shorter than the fixed focal length of the first camera 150.

When the lens 161 is a fixed-focal-length lens and the lens 151 is a zoom lens whose angle of view is variable, the "camera capable of imaging an object with a wide angle" means that the fixed angle of view of the second camera 160 is wider than the maximum value of the variable angle of view of the first camera 150. In other words, the "camera capable of imaging an object with a wide angle" in this case means that the fixed focal length of the second camera 160 is smaller than the minimum value of the variable focal length of the first camera 150.

When the lens 161 is a zoom lens and the lens 151 is a fixed-focal-length lens, the "camera capable of imaging an object with a wide angle" means that the maximum value of the variable angle of view of the second camera 160 is greater than the fixed angle of view of the first camera 150. In other words, the "camera capable of imaging an object with a wide angle" in this case means that the minimum value of the variable focal length of the second camera 160 is smaller than the fixed focal length of the first camera 150.

When each of the lens 151 and the lens 161 is a zoom lens, the "camera capable of imaging an object with a wide angle" means that the maximum value of the variable angle of view of the second camera 160 is greater than the maximum value of the variable angle of view of the first camera 150. In other words, the "camera capable of imaging an object with a wide angle" in this case means that the minimum value of the variable focal length of the second camera 160 is smaller than the minimum value of the variable focal length of the first camera 150.

Hereinafter, for the sake of description, the first camera 150 is referred to as a "standard camera 150", and the second camera 160 is referred to as a "wide-angle camera 160". In one embodiment, the lens 151 of the standard camera 150, the lens 161 of the wide-angle camera 160, and the lens 171 of the in-camera 170 are fixed-focal-length lenses. Alternatively, at least one of the lenses 151, 161, and 171 may be a zoom lens.

Usage Pattern of Electronic Apparatus

Figure 5:
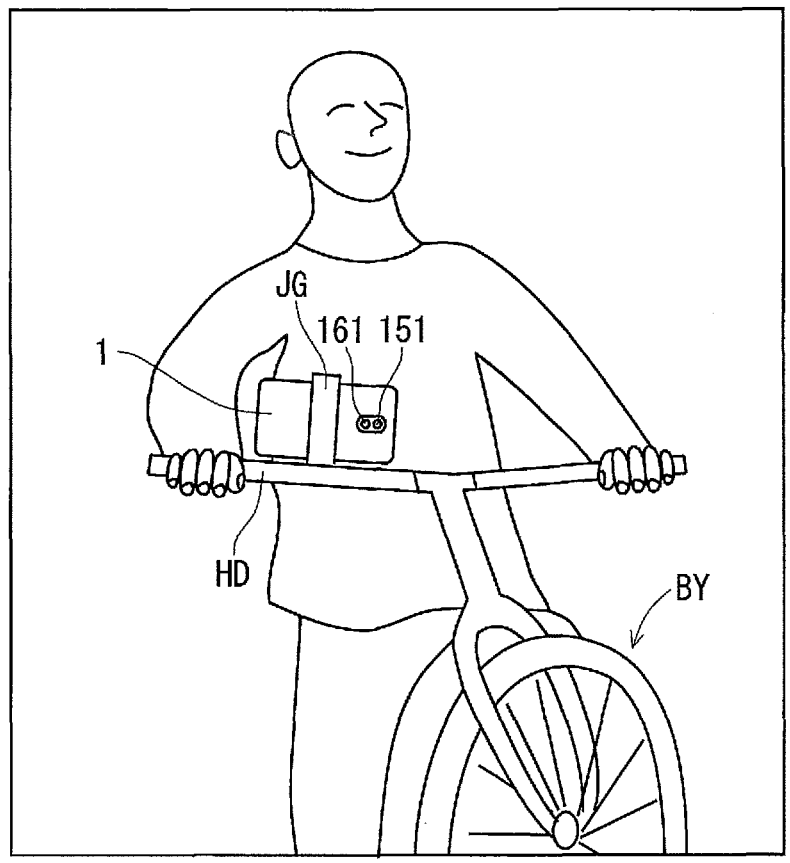
FIG. 5 illustrates an example of a usage pattern of the electronic apparatus.

FIG. 5 illustrates an example of a usage pattern of the electronic apparatus 1. The electronic apparatus 1 illustrated in FIG. 5 is used by being fixed to a handle HD of a bicycle BY such that the back surface including the first camera 151 and the second camera 160 as the "out-cameras" faces toward the front of the bicycle BY. Herein, the electronic apparatus 1 is fixed to the handle HD with a jig JG such that the electronic apparatus 1 is positioned sideways, that is to say, the long side of the electronic apparatus 1 is positioned horizontally. The electronic apparatus 1 is used such that the lenses 151, 161 are horizontally located side by side. The camera application is activated, and the first camera 150 and the second camera 160 capture videos through the lens 151 and the lens 161, respectively.

Operations of Electronic Apparatus During Execution of Camera Application

Figure 7:
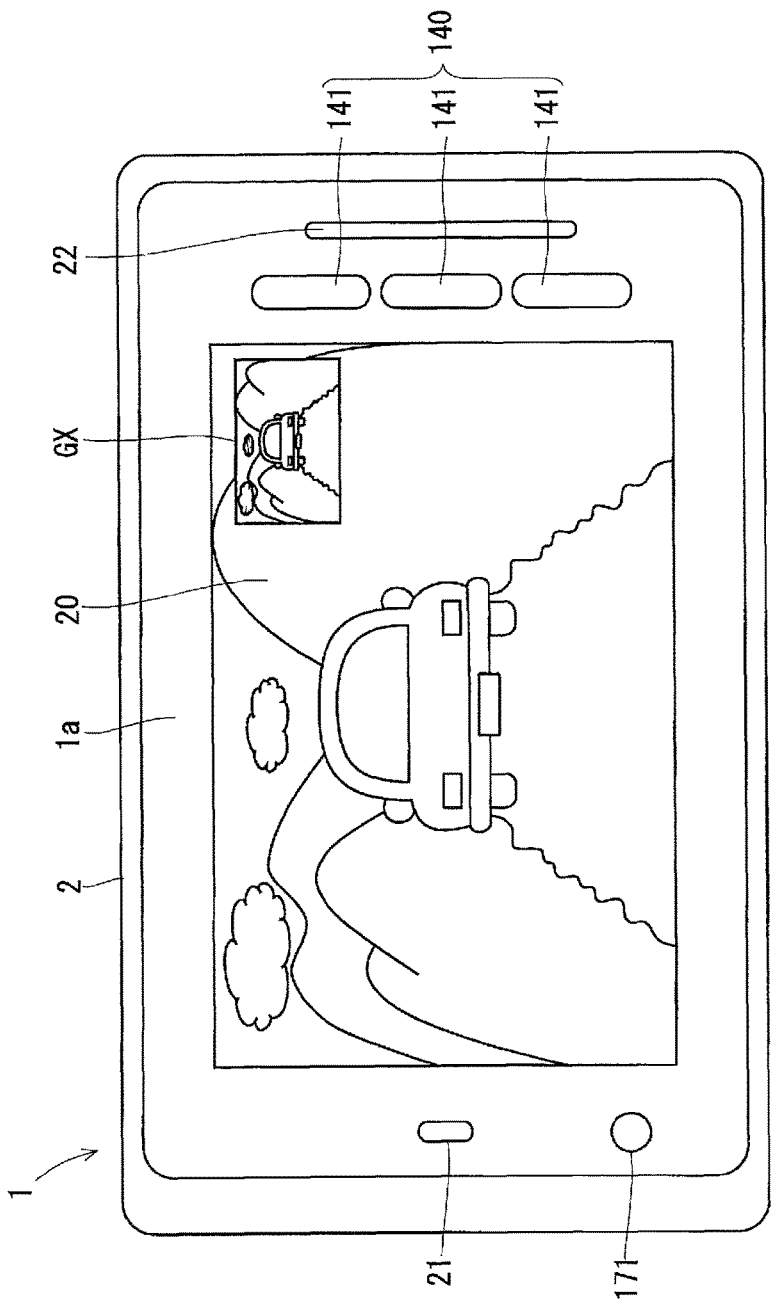
FIG. 7 illustrates an example display of a display screen.

FIG. 6 illustrates a flowchart showing operations of the electronic apparatus 1 during execution of a camera application. When a predetermined operation is performed on the display screen 20, the controller 100 starts the execution of the camera application in the storage 103, and herein, the application for capturing a video using the wide-angle camera 160. In Step S1, a power source is supplied to the wide-angle camera 160 to activate the wide-angle camera 160, and the wide-angle camera 160 starts recording. At this time, the video captured by the wide-angle camera 160 is displayed on the display screen 20, and a local screen, namely, a gallery, is displayed on part of the display screen 20. The video captured by the wide-angle camera 160, which is a recorded subject, is displayed on the gallery. FIG. 7 illustrates this state.

FIG. 7 illustrates the display screen 20 of the electronic apparatus 1 fixed to the handle HD (FIG. 5) of the bicycle BY (FIG. 5) when viewed from a driver of the bicycle BY. In FIG. 7, a video captured by the wide-angle camera 160 is displayed on the display screen 20 while the same video is displayed at a reduced scale as a gallery GX in the upper right-hand corner of the display screen 20. The gallery is typically an application that enables the user to organize images such as pictures and videos and edit them. In one embodiment, the gallery is activated as an application for displaying a video during recording at the reduced scale, and herein, the video captured by the wide-angle camera 160, which is the recorded subject, is thus displayed as the gallery GX. The video as the recorded subject is stored in the hard disk drive, the SSD, or the like in the storage 103.

The image data captured by the wide-angle camera 160 is provided to the controller 100, and the controller 100 detects whether an obstruction that blocks imaging is adhering to the lens 161 (Step S2). Various techniques have conventionally been proposed for detection of dirt on a lens. However, in view of application of the techniques to mobile phones such as smartphones, the technique that needs additional parts for detection cannot be used, and the technique for performing detection in image data processing is preferable.

For example, since a video includes a plurality of frame images, a technique for performing detection by comparing the frame images is one example. In other words, information about intensity of pixels in each line of one frame of image data is stored in the storage 103, and an amount (difference) of change in intensity between the pixels is then obtained by comparing the one frame of image data with a next frame of image data.

It is determined that an obstruction is adhering to the lens (the lens is dirty) when the amount of change is greater than a predetermined value, and the determination result as well as information about a position of the corresponding pixel are stored. This process is performed on each pixel in each line of image data, so that the presence or absence of the adhesion of the obstruction and an adhesion area of the obstruction can be specified. In this case, two frames of image data for comparison may be obtained from a unit that stores the video in the storage 103, or may be obtained from the other storage unit in which the video has been previously stored.

As described with reference to FIG. 5, such a detection method is suitable when dirt or water is unexpectedly adhering to the lens of the camera used for capturing a video in front of the electronic apparatus 1 that is fixed to the handle HD of the bicycle BY. Although it has been described above that the amount of change in intensity between the one frame image and the next frame image is obtained, sampling intervals may be appropriately set, instead that the amount of change at the intervals of one frame is obtained.

When the obstruction is adhering to the lens, the intensity of the image data remains unchanged in the adhesion area of the obstruction. Thus, the adhesion area of the obstruction may be specified by detecting pixels whose intensity has not been changed for more than a predetermined period of time.

Although the example of using the difference in intensity for detection has been described above, a difference in color may be used. In this case, it may be determined that the obstruction is adhering to the lens (the lens is dirty) when an amount (difference) of change in color between pixels is obtained and the amount of change is greater than a predetermined value. Alternatively, the adhesion area of the obstruction may be specified by detecting pixels whose color has not been changed for more than a predetermined period of time. The reason is that when the obstruction is adhering to the lens, the difference in color of the image data remains unchanged in the adhesion area of the obstruction.

Figure 8:
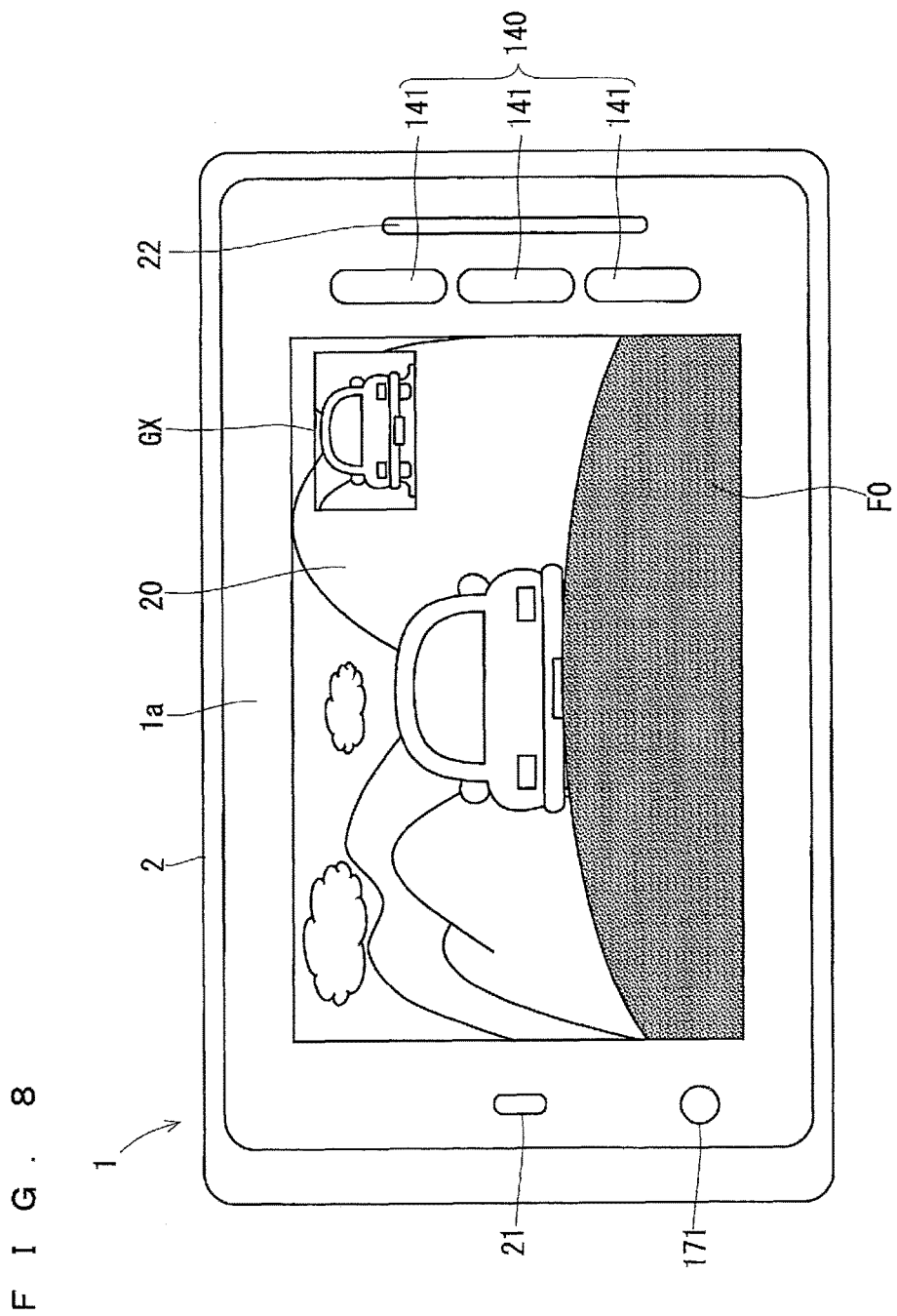
FIG. 8 illustrates an example display of the display screen.

The process in Step S2 is repeatedly performed during the execution of the camera application. When it is determined that the obstruction is adhering to the lens 161, the recorded subject is switched to a video captured by the standard camera 150 in Step S3, and the display of the video captured by the wide-angle camera 160 on the display screen 20 is stopped. FIG. 8 illustrates this state.

In FIG. 8, the video captured by the wide-angle camera 160 is displayed on the display screen 20 in which an obstruction FO is imaged on the lower side of the screen while the video captured by the standard camera 150 is displayed at the reduced scale on the gallery GX in which the obstruction FO is not imaged. As described above, the gallery is activated as the application for displaying the video during recording at the reduced scale in one embodiment, and herein, the video captured by the standard camera 150, which is the recorded subject, is thus displayed on the gallery GX. The video is captured by the standard camera 150, thereby being displayed as an image at a small angle of view on the gallery GX.

Herein, the standard camera 150 may be supplied with the power source in addition to the wide-angle camera 160 in Step S1 to be activated in advance instead of being activated when it is determined that the obstruction is adhering to the lens 161. Consequently, when it is determined that the obstruction is adhering to the lens 161, the recorded subject can be switched immediately to a recording of a video captured by the standard camera 150.

After the recorded subject is switched to the video captured by the standard camera 150 in Step S3, the controller 100 detects whether the obstruction that blocks imaging is adhering to the lens 161 on the basis of the image data captured by the wide-angle camera 160 (Step S4). The detection is the same as that in Step S2. However, the recorded subject is the video captured by the standard camera 150, so that the image data obtained from the unit that stores the video in the storage 103 cannot be used for the process in Step S4. The image data is thus obtained from the other storage unit in which the image data captured by the wide-angle camera 160 has been previously stored.

The process in Step S4 is repeatedly performed at predetermined sampling intervals even after the recorded subject has been switched. When the adhesion of the obstruction cannot be detected in the lens 161, that is to say, when it is determined that the obstruction, which has been removed, is not adhering to the lens 161, the recorded subject is switched to the video captured by the wide-angle camera 160 and the video during recording captured by the wide-angle camera 160 is then displayed on the gallery in Step S5. FIG. 7 illustrates this state. Hereinafter, the processes after Step S2 are repeated during the execution of the camera application.

As described above, when the obstruction is adhering to the lens 161 during the recording of the video captured by the wide-angle camera 160, the recording control that switches the recorded subject to the video captured by the standard camera 150 is performed. Thus, recording does not continue while the obstruction is adhering to the lens 161, and a decline in quality of the recorded image due to the adhering obstruction can be suppressed.

Switching the video captured by the wide-angle camera 160 to the video captured by the standard camera 150 may sometimes cause the recorded image to slightly look unnatural due to a difference in angle of view between the cameras. The recorded image may be made to look more natural by, for example, performing digital processing on the image data obtained from the standard camera 150 and enlarging the image data of the end portion of the picture captured by the standard camera 150 for interpolation to make the recorded image close to a wide image.

Although it has been described above that the detection is performed whether the obstruction that blocks imaging is adhering to the lens 161 in Steps S2 and S4, the processes in Steps S2 and S4 are also effective even in a case where the obstruction covers the front surface of the lens 161 instead of being adhering thereto.

For example, even in a case where a strap attached to the electronic apparatus 1 hangs in front of the lens 161, the strap can be identified as an obstruction that blocks imaging. Thus, the recorded subject is switched to the video captured by the standard camera 150 to continue recording, and the recorded subject is switched to the video captured by the wide-angle camera 160 by removing the strap from the front of the lens 161. The same applies to a case where the lens 161 is covered with a photographer's hand, a cover of the electronic apparatus 1, or the like other than the strap. The present disclosure is effective in the case where at least part of the lens 161 is covered with the obstruction and is not limited to the adhesion of the obstruction to the lens.

First Modification

Figure 9:
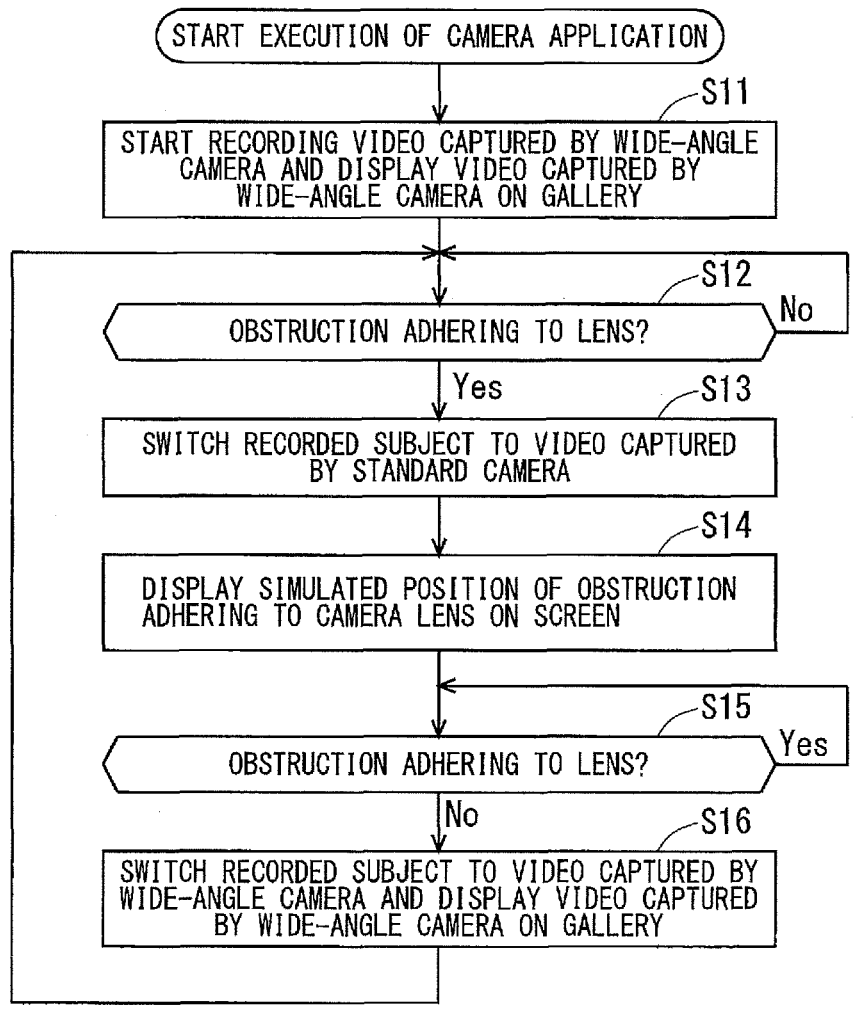
FIG. 9 illustrates a flowchart showing operations of the electronic apparatus.

FIG. 9 illustrates a flowchart showing a modification of operations of the electronic apparatus 1 during the execution of the camera application. In FIG. 9, operations of Steps S11 to S13 are the same as the operations of Steps S1 to S3, which have been described with reference to FIG. 6, and the descriptions are omitted here.

Figure 10:
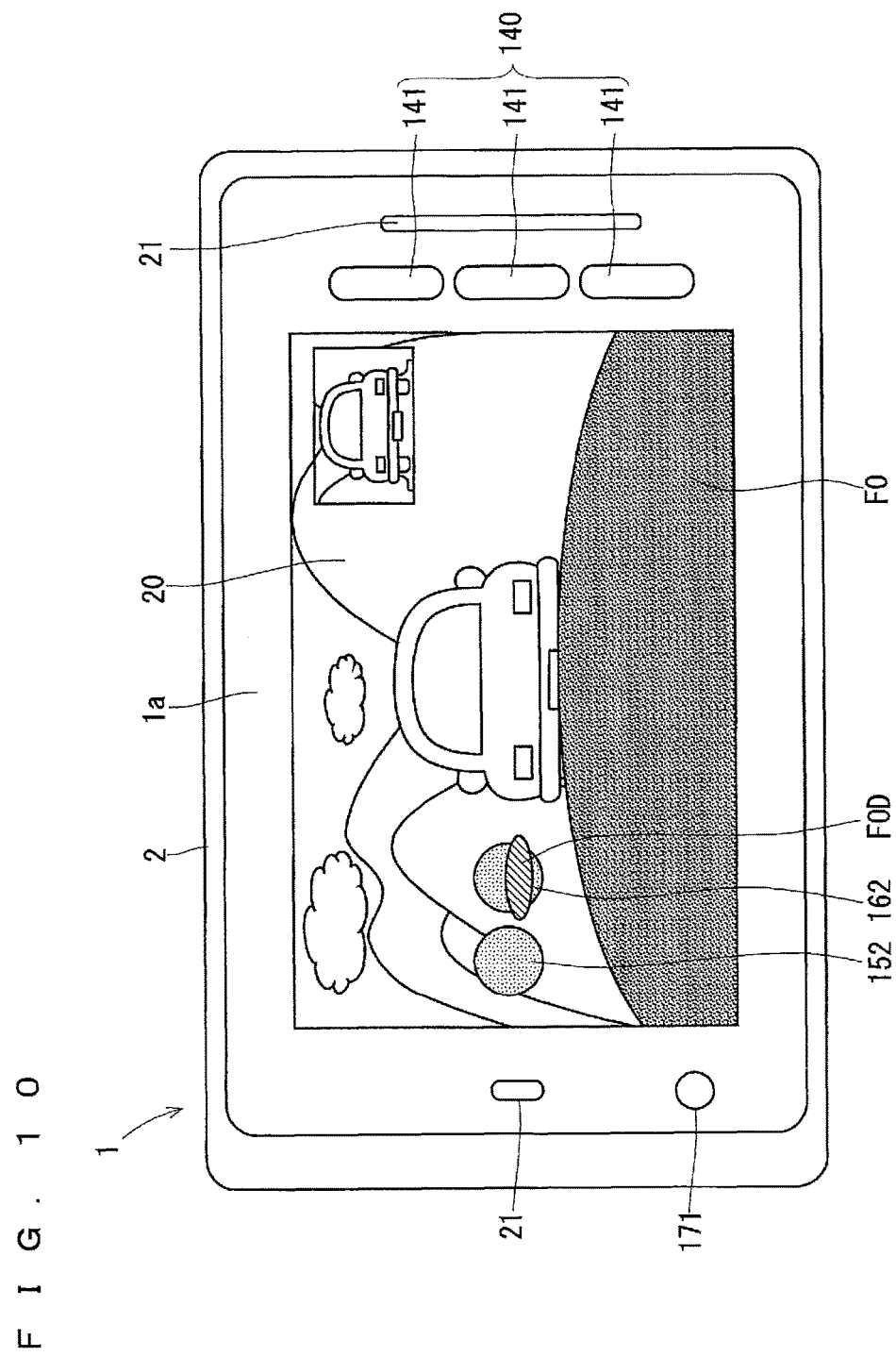
FIG. 10 illustrates an example display of the display screen.

After the recorded subject is switched to the video captured by the standard camera 150 in Step S13, a simulated position of the obstruction adhering to the camera lens is displayed on the display screen 20 (Step S14). FIG. 10 illustrates this state.

Figure 11:
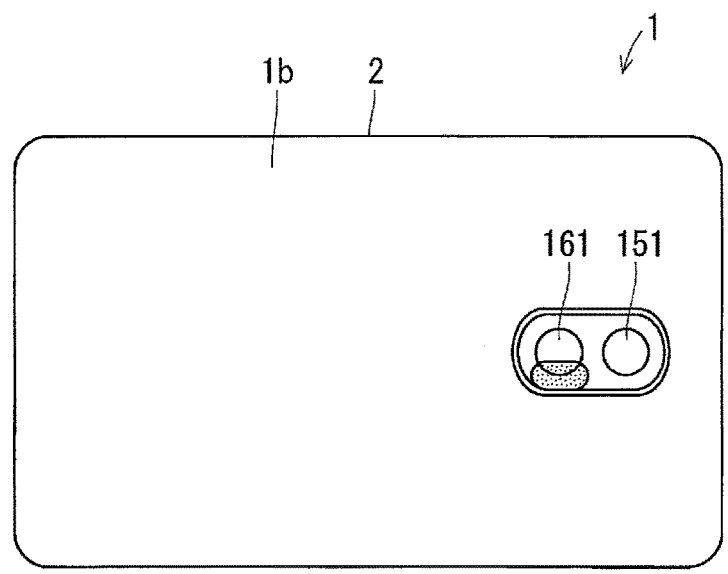
FIG. 11 illustrates the electronic apparatus when viewed from the rear side.

In FIG. 10, the video captured by the wide-angle camera 160 is displayed on the display screen 20 in which the obstruction FO is imaged on the lower side of the screen. A simulated lens 152 and a simulated lens 162 that simulatively show the lens 151 and the lens 161 are displayed on the left side of the midsection of the screen. A simulated obstruction FOD is displayed on the lower side of the simulated lens 162 so as to simulatively show that the obstruction FO is adhering. FIG. 11 illustrates how the obstruction FO is adhering when viewed from the rear side of the electronic apparatus 1. The simulated lenses 152 and 162 are displayed such that the lenses 151 and 161 are shown in the perspective view from the front side of the electronic apparatus 1, and thus the position of the obstruction adhering to the lens is displayed to be visually recognizable.

The simulated obstruction FOD is displayed by estimating which part of the lens 161 the obstruction is adhering to on the basis of the adhesion area of the obstruction specified in Step S12 (identical to Step S2). The simulated obstruction FOD is displayed while overlapping the simulated lens 162, thereby providing the clear adhesion position of the obstruction to the user of the electronic apparatus 1. The adhesion area of the obstruction and the position of the obstruction on the lens 161 that are specified in Step S12 correspond to each other sufficiently in the schematic estimation process. For example, when the adhesion area of the obstruction is lower than the middle of the display screen 20, the simulated obstruction FOD may be displayed on the lower side of the simulated lens 162, assuming that the obstruction is adhering to the lower side of the lens 161. When the adhesion area of the obstruction is higher than the middle of the display screen 20, the stimulated obstruction FOD may be displayed on the upper side of the simulated lens 162, assuming that the obstruction is adhering to the upper side of the lens 161.

The user who sees this, namely, the user who drives the bicycle BY in the example of FIG. 5, can remove the obstruction FO by putting a hand around the back surface of the electronic apparatus 1 bonded to the handle HD and wiping the obstruction FO off the lens 161 while the user drives the bicycle BY. Although the actual positions of the lenses 151 and 161 and the display positions of the simulated lenses 152 and 162 are slightly misaligned, they are misaligned to a degree which does not interfere with the work of wiping the obstruction FO.

After the simulated position of the obstruction adhering to the camera lens is displayed on the display screen 20 in Step S14, the controller 100 detects whether the obstruction that blocks imaging is adhering to the lens 161 on the basis of the image data captured by the wide-angle camera 160 (Step S15). The detection is the same as that in Step S4, which has been described with reference to FIG. 6, and the description is omitted here.

The process in Step S15 is repeatedly performed at the predetermined sampling intervals when it is determined that the obstruction is adhering to the lens 161. When it is determined that the obstruction, which has been removed by cleaning the lens 161, is not adhering to the lens 161, the recorded subject is switched to the video captured by the wide-angle camera 160, and the video during recording captured by the wide-angle camera 160 is then displayed on the gallery in Step S16. Hereinafter, the processes after Step S12 are repeated during the execution of the camera application.

As described above, when the obstruction is adhering to the lens 161 during the recording of the video captured by the wide-angle camera 160, part of the lens 161 to which the obstruction FO is adhering is estimated, and the obstruction FO is simulatively displayed on the display screen 20. Thus, the user of the electronic apparatus 1 can visually recognize the adhesion position of the obstruction and easily remove the obstruction FO on the lens 161.

Although it has been described above that the configuration includes the combination of the process of switching the recorded subject to the video captured by the standard camera 150 and the process of displaying the simulated position of the obstruction adhering to the camera lens on the display screen 20 when the obstruction is adhering to the lens 161 during the recording of the video captured by the wide-angle camera 160, the configuration may perform only the process of displaying the simulated position of the obstruction adhering to the camera lens on the display screen 20 without switching the recorded subject to the video even if the obstruction is detected. The same holds true for the case in which the obstruction is adhering to the lens 151 during the recording of the video captured by the standard camera 150.

Second Modification

FIG. 12 illustrates a flowchart showing a modification of operations of the electronic apparatus 1 during the execution of the camera application. In FIG. 12, operations of Steps S21 to S23 are the same as the operations of Steps S1 to S3, which have been described with reference to FIG. 6, and the descriptions are omitted here.

After the recorded subject is switched to the video captured by the standard camera 150 in Step S23, the adhesion of the obstruction FO is informed to the user of the electronic apparatus 1 by displaying the obstruction FO (Step S24) with emphasis. FIG. 13 illustrates this state.

In FIG. 13, the video captured by the wide-angle camera 160 is displayed on the display screen 20 in which the obstruction FO is imaged on the lower side of the screen. A light-emitting region ER is displayed around the obstruction FO so as to emphasize the obstruction FO. The light-emitting region ER may be set along the outer edge of the adhesion area of the obstruction specified in Step S22 (identical to Step S2).

When the obstruction FO is detected in Step S22, the information may be transmitted to wearable apparatuses (such as glasses, watches, and wristbands) and healthcare products that are capable of being synchronized with the electronic apparatus 1, and the wearable apparatus may vibrate or emit light to inform the user of the electronic apparatus 1 that the obstruction FO is adhering. Alternatively, the entire display screen 20 of the electronic apparatus 1 may emit light to inform the user of the electronic apparatus 1 that the obstruction FO is adhering. For the configurations above, the obstruction FO does not necessarily need to be displayed with emphasis. When the obstruction FO is displayed with emphasis, the user does not necessarily need to be informed via the wearable apparatus or the like.

After the user of the electronic apparatus 1 is informed that the obstruction FO is adhering in Step S24, the controller 100 detects whether the obstruction that blocks imaging is adhering to the lens 161 on the basis of the image data captured by the wide-angle camera 160 (Step S25). The detection is the same as that in Step S4, which has been described with reference to FIG. 6, and the description is omitted here.

The process in Step S25 is repeatedly performed at the predetermined sampling intervals when it is determined that the obstruction is adhering to the lens 161. When it is determined that the obstruction, which has been removed by cleaning the lens 161, is not adhering to the lens 161, the recorded subject is switched to the video captured by the wide-angle camera 160, and the video during recording captured by the wide-angle camera 160 is then displayed on the gallery in Step S26. Hereinafter, the processes after Step S22 are repeated during the execution of the camera application.

As described above, when the obstruction is adhering to the lens 161 during the recording of the video captured by the wide-angle camera 160, the user of the electronic apparatus 1 is informed that the obstruction FO is adhering. Thus, the user of the electronic apparatus 1 can recognize the adhesion of the obstruction in an early stage and remove the obstruction FO on the lens 161 in the early stage.

Although it has been described above that the configuration includes the combination of the process of switching the recorded subject to the video captured by the standard camera 150 and the process of informing the user of the electronic apparatus 1 that the obstruction FO is adhering when the obstruction is adhering to the lens 161 during the recording of the video captured by the wide-angle camera 160, the configuration may perform only the process of informing the user that the obstruction FO is adhering without switching the video as the recorded subject even if the obstruction is detected. The same holds true for the case in which the obstruction is adhering to the lens 151 during the recording of the video captured by the standard camera 150.

Third Modification

Figure 14:
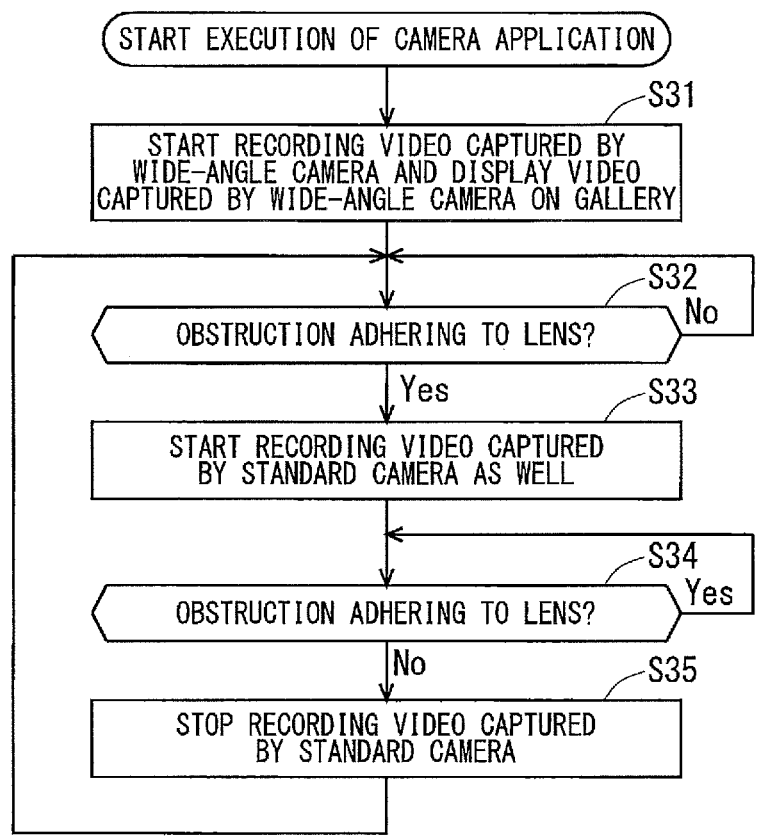
FIG. 14 illustrates a flowchart showing operations of the electronic apparatus.

FIG. 14 illustrates a flowchart showing a modification of operations of the electronic apparatus 1 during the execution of the camera application. In FIG. 14, operations of Steps S31 and S32 are the same as the operations of Steps S1 and S2, which have been described with reference to FIG. 6, and the descriptions are omitted here.

When it is determined that the obstruction is adhering to the lens 161 in Step S32 (identical to Step S2), recording the video captured by the standard camera 150 starts (Step S33). In this case, the video captured by the wide-angle camera 160 is displayed on the gallery GX. The video captured by the wide-angle camera 160 and the video captured by the standard camera 150 are both stored in the hard disk, the SSD, or the like in the storage 103.

After recording the video captured by the standard camera 150 starts in Step S33, the controller 100 detects whether the obstruction that blocks imaging is adhering to the lens 161 on the basis of the image data captured by the wide-angle camera 160 (Step S34). The detection is the same as that in Step 4, which has been described with reference to FIG. 6, and the description is omitted here.

The process in Step S34 is repeatedly performed at the predetermined sampling intervals when it is determined that the obstruction is adhering to the lens 161. When it is determined that the obstruction, which has been removed by cleaning the lens 161, is not adhering to the lens 161, recording the video captured by the standard camera 150 stops in Step S35. Hereinafter, the processes after Step S32 are repeated during the execution of the camera application.

As described above, when the obstruction is adhering to the lens 161 during the recording of the video captured by the wide-angle camera 160, the video captured by the standard camera 150 is recorded as well. Thus, the user of the electronic apparatus 1 can obtain a series of videos without the obstruction adhering to the lens 161 by editing the recorded video captured by the wide-angle camera 160 and the recorded video captured by the standard camera 150 after the end of the camera application.

Fourth Modification

The descriptions above exemplify the case in which the obstruction is adhering to the lens 161 during the recording of the video captured by the wide-angle camera 160. The operations of the electronic apparatus 1 when the obstruction is adhering to the lens 151 during the recording of the video captured by the standard camera 150 are the reverse of the operations described above, and the video as the recorded subject is changed.

The descriptions above also exemplify the standard camera 150 and the wide-angle camera 160 as the out-cameras and describe that both of the cameras have the different angles of view. The first camera 150 may be a camera having the number of pixels greater than that of the second camera 160 and may be, for example, a camera that creates images of 1080 lines×1920 pixels. The second camera 160 may be a camera having the number of pixels less than that of the first camera 150 and may be, for example, a camera having a different number of pixels such as a camera that creates images of 720 lines×1280 pixels. When an obstruction adhering to a lens of a camera with low image quality is detected during a recording of a video captured by the camera, control of switching to the recording of the video captured by the camera with low image quality is also conceivable. Alternatively, when an obstruction adhering to a lens of a camera with high image quality is detected during a recording of a video captured by the camera, control of switching to the recording of the video captured by the camera with low image quality is also conceivable. In these cases, one of the first camera 150 and the second camera 160 may be a camera having the number of pixels extremely higher than that of the other one. For example, one of the cameras may have the number of pixels almost ten times as many as that of the other one.

Although the examples above have described the cases in which the technology of the present disclosure is applied to mobile phones such as smartphones, the technology of the present disclosure is also applicable to other electronic apparatuses including a plurality of imaging units. For example, the technology of the present disclosure is also applicable to electronic apparatuses such as digital cameras, personal computers, and tablet terminals.

While the electronic apparatus 1 has been described above in detail, the above description is in all aspects illustrative and not restrictive, and the present disclosure is not limited thereto. The modifications described above are applicable in combination as long as they are not mutually inconsistent. It is understood that numerous modifications which have not been exemplified can be devised without departing from the scope of the present disclosure.

What is claimed is:

1. An electronic apparatus, comprising:
a first camera and a second camera each configured to be able to image a video;
a lens covering the second camera;
at least one processor configured to control recordings of the videos captured by the first camera and the second camera; and
a display screen configured to display the videos captured by the first camera and the second camera,
wherein the at least one processor is configured to
detect, on the basis of an image data captured by the second camera, whether at least part of the lens is covered with an obstruction that blocks imaging during the recording of the video captured by the second camera, and
control so as to switch the recording of the video captured by the second camera to the recording of the video captured by the first camera in a case where the at least part of the lens is covered with the obstruction, wherein the at least one processor is configured to display, on the display screen, a simulated position of the obstruction on the lens in the case where the lens is covered with the obstruction.

2. The electronic apparatus according to claim 1, wherein the at least one processor is configured to control so as to switch the recording of the video captured by the first camera to the recording of the video captured by the second camera in a case where the obstruction cannot be detected after the recording of the video captured by the second camera has been switched to the recording of the video captured by the first camera.

3. The electronic apparatus according to claim 1, wherein the at least one processor is configured to inform a user about the obstruction in the case where the lens is covered with the obstruction.

4. The electronic apparatus according to claim 1, wherein the second camera is configured to be able to image an object with an angle wider than an angle with which the first camera images an object.

5. The electronic apparatus according to claim 1, wherein the at least one processor is configured to locally display a video as a recorded subject on part of the display screen.

6. An electronic apparatus, comprising:
a first camera and a second camera each configured to be able to image a video;
a lens covering the second camera;
at least one processor configured to control recordings of the videos captured by the first camera and the second camera; and
a display screen configured to display the videos captured by the first camera and the second camera,
wherein the at least one processor is configured to
detect, on the basis of an image data captured by the second camera, whether at least part of the lens is covered with an obstruction that blocks imaging during the recording of the video captured by the second camera, and
control so as to start recording the video captured by the first camera in a case where the at least part of the lens is covered with the obstruction, wherein the at least one processor is further configured to display on the display screen, a simulated position of the obstruction on the lens in the case where the lens is covered with the obstruction.

7. The electronic apparatus according to claim 6, wherein the at least one processor is configured to control so as to continue only the recording of the video captured by the second camera in a case where the obstruction cannot be detected after recording the video captured by the first camera has started.

8. A recording control method of an electronic apparatus that comprises a first camera and a second camera each configured to be able to image a video, a lens covering the second camera, at least one processor configured to control recordings of the videos captured by the first camera and the second camera, and a display screen configured to display the videos captured by the first camera and the second camera, wherein the at least one processor performs recording control that comprises the steps of:

(a) detecting, on the basis of an image data captured by the second camera, whether at least part of the lens is covered with an obstruction that blocks imaging during the recording of the video captured by the second camera; and (b) switching the recording of the video captured by the second camera to the recording of the video captured by the first camera in a case where it is detected that the lens is covered with the obstruction in the step (a), wherein the at least one processor is configured to display, on the display screen, a simulated position of the obstruction on the lens in the case where the lens is covered with the obstruction.

* * * * *